United States Patent
Matas et al.

(10) Patent No.: US 10,775,991 B2
(45) Date of Patent: *Sep. 15, 2020

(54) OVERLAY IMAGES AND TEXTS IN USER INTERFACE

(71) Applicant: Facebook, Inc., Menlo Park, CA (US)

(72) Inventors: Michael Matas, San Francisco, CA (US); Kimon Tsinteris, San Francisco, CA (US); Austin Sarner, San Francisco, CA (US); Charles Melcher, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 14/572,405

(22) Filed: Dec. 16, 2014

(65) Prior Publication Data

US 2015/0100880 A1    Apr. 9, 2015

Related U.S. Application Data

(63) Continuation of application No. 13/489,265, filed on Jun. 5, 2012, now Pat. No. 8,984,428.

(Continued)

(51) Int. Cl.
*G06T 15/60*        (2006.01)
*G06T 11/60*        (2006.01)
(Continued)

(52) U.S. Cl.
CPC ............ *G06F 3/0485* (2013.01); *G06F 3/017* (2013.01); *G06F 3/0481* (2013.01);
(Continued)

(58) Field of Classification Search
CPC .......... G06T 11/001; G06T 11/60; G06T 7/11; G06T 7/13; H04N 1/4092; H04N 1/60; H04N 13/0422; H04N 9/3182; H04N 9/646; G06F 17/211; G06F 3/04886; G06F 3/04883; G06F 2203/0381; G06F 2203/0384; G06F 2203/04803; G06F 3/0231; G06F 3/038; G06F 3/048; G06F 3/0481; G06F 3/0482; G06F 11/1438; G06F 11/1441; G06F 17/30; G06F 21/568; G06F 21/575; G06F 3/0485; G06F 9/4406; G06F 9/4418; G06F 17/212; G06F 40/103; G06F 3/0486; C07D 471/06; C07D 221/18; C07D 235/18; C07D 311/78; C07D 491/06; C07D 519/00

See application file for complete search history.

(56) References Cited

U.S. PATENT DOCUMENTS 4,730,314 A    3/1988  Noguchi
5,727,129 A    3/1998  Barrett
(Continued)

OTHER PUBLICATIONS

U.S. Appl. No. 14/569,475, filed Dec. 12, 2014, Matas.
(Continued)

*Primary Examiner* — Maryam M Ipakchi
(74) *Attorney, Agent, or Firm* — Jordan IP Law, LLC (57) ABSTRACT

In one embodiment, overlaying a first element on top of a second element in a user interface; and adjusting visual appearance of the first element based on a portion of the second element underneath the first element.

19 Claims, 4 Drawing Sheets

Related U.S. Application Data (60) Provisional application No. 61/593,841, filed on Feb. 1, 2012.

(51) Int. Cl.

| | | |
|---|---|---|
| *G06F 3/0482* | (2013.01) | |
| *G06F 40/103* | (2020.01) | |
| *G06F 3/0481* | (2013.01) | |
| *G06F 3/0485* | (2013.01) | |
| *G06F 3/0484* | (2013.01) | |
| *G06F 3/01* | (2006.01) | |
| *G06F 3/0488* | (2013.01) | |
| *G06F 8/34* | (2018.01) | |
| *H04L 29/08* | (2006.01) | |
| *G06F 40/137* | (2020.01) | |
| *G06F 17/21* | (2006.01) | |
| *G06F 17/22* | (2006.01) | |

(52) U.S. Cl.
CPC .......... *G06F 3/0482* (2013.01); *G06F 3/0484* (2013.01); *G06F 3/04815* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 8/34* (2013.01); *G06F 40/103* (2020.01); *G06F 40/137* (2020.01); *G06T 11/60* (2013.01); *G06T 15/60* (2013.01); *H04L 67/18* (2013.01); *G06F 2203/04808* (2013.01); *H04L 67/06* (2013.01)

(56) References Cited

U.S. PATENT DOCUMENTS

| | | | |
|---|---|---|---|
| 5,933,525 A * | 8/1999 | Makhoul | G06K 9/00879 382/185 |
| 6,421,071 B1 | 7/2002 | Harrison | |
| 6,847,388 B2 | 1/2005 | Anderson | |
| 6,934,740 B1 | 8/2005 | Lawande | |
| 6,948,125 B2 | 9/2005 | Detweiler | |
| 6,971,957 B2 | 12/2005 | Osako | |
| 7,320,113 B2 | 1/2008 | Roberts | |
| 7,434,245 B1 | 10/2008 | Shiga | |
| 7,439,975 B2 | 10/2008 | Hsu | |
| 7,663,620 B2 | 2/2010 | Robertson | |
| 7,663,623 B2 | 2/2010 | Zhou | |
| 7,664,739 B2 | 2/2010 | Farago | |
| 7,667,719 B2 | 2/2010 | Goodwin | |
| 7,675,518 B1 | 3/2010 | Miller | |
| 7,689,933 B1 | 3/2010 | Parsons | |
| 7,743,322 B2 | 6/2010 | Atkins | |
| 7,769,794 B2 | 8/2010 | Moore | |
| 7,797,641 B2 | 9/2010 | Karukka | |
| 7,817,823 B1 | 10/2010 | O'Donnell | |
| 7,890,889 B2 | 2/2011 | Artman | |
| 7,916,157 B1 | 3/2011 | Kelley | |
| 7,996,788 B2 | 8/2011 | Carmichael | |
| 8,006,195 B1 | 8/2011 | Woodings | |
| 8,082,522 B2 | 12/2011 | Kinouchi | |
| 8,131,898 B2 | 3/2012 | Shah | |
| 8,140,404 B1 | 3/2012 | Scott | |
| 8,341,543 B2 | 12/2012 | Shah | |
| 8,365,091 B2 | 1/2013 | Young | |
| 8,416,198 B2 | 4/2013 | Rathnam | |
| 8,423,889 B1 | 4/2013 | Zagorie | |
| 8,438,504 B2 | 5/2013 | Cranfill | |
| 8,458,614 B2 | 6/2013 | Smith | |
| 8,473,868 B1 | 6/2013 | Kauffman | |
| 8,516,385 B1 | 8/2013 | Eismann | |
| 8,533,190 B2 | 9/2013 | Walker | |
| 8,539,344 B2 | 9/2013 | Hull | |
| 8,539,384 B2 | 9/2013 | Hinckley | |
| 8,549,442 B2 | 10/2013 | Marks | |
| 8,584,027 B2 | 11/2013 | Quennesson | |
| 8,635,531 B2 | 1/2014 | Graham | |
| 8,639,694 B1 | 1/2014 | Wolfe | |
| 8,656,312 B2 | 2/2014 | Kagaya | |
| 8,669,950 B2 | 3/2014 | Forstall | |
| 8,683,378 B2 | 3/2014 | Bull | |
| 8,736,561 B2 | 5/2014 | Anzures | |
| 8,799,658 B1 | 8/2014 | Seller | |
| 8,806,371 B2 | 8/2014 | Louch | |
| 8,856,678 B1 | 10/2014 | Cho | |
| 8,856,684 B2 | 10/2014 | Duhig | |
| 8,904,304 B2 | 12/2014 | Farago | |
| 8,930,992 B2 | 1/2015 | Sugiyama | |
| 8,976,199 B2 | 3/2015 | Matas | |
| 8,977,980 B2 | 3/2015 | Abe | |
| 8,984,428 B2 | 3/2015 | Matas | |
| 8,990,691 B2 | 3/2015 | Matas | |
| 8,990,719 B2 | 3/2015 | Matas | |
| 8,997,151 B2 | 3/2015 | Chai | |
| 9,003,305 B2 | 4/2015 | Matas | |
| 9,007,371 B2 | 4/2015 | Matas | |
| 9,009,626 B2 | 4/2015 | Tsuk | |
| 9,098,168 B2 | 8/2015 | Matas | |
| 2001/0030667 A1 | 10/2001 | Kelts | |
| 2001/0033303 A1 | 10/2001 | Anderson | |
| 2002/0029232 A1 | 3/2002 | Bobrow | |
| 2002/0070982 A1 | 6/2002 | Hill | |
| 2002/0107892 A1 | 8/2002 | Chittu | |
| 2003/0001907 A1 | 1/2003 | Bergsten | |
| 2003/0046401 A1 | 3/2003 | Abbott | |
| 2003/0051214 A1 | 3/2003 | Graham | |
| 2003/0090504 A1 | 5/2003 | Brook | |
| 2003/0236917 A1 | 12/2003 | Gibbs | |
| 2004/0001106 A1 | 1/2004 | Deutscher | |
| 2004/0095376 A1 | 5/2004 | Graham | |
| 2004/0145603 A1 | 7/2004 | Soares | |
| 2005/0005246 A1 | 1/2005 | Card | |
| 2005/0010955 A1 | 1/2005 | Elia | |
| 2005/0055426 A1 | 3/2005 | Smith | |
| 2005/0071783 A1 | 3/2005 | Atkins | |
| 2005/0177798 A1 | 8/2005 | Thomson | |
| 2005/0210403 A1 | 9/2005 | Satanek | |
| 2005/0262149 A1 | 11/2005 | Jung | |
| 2006/0017735 A1 | 1/2006 | Rabb | |
| 2006/0036625 A1 | 2/2006 | Judd | |
| 2006/0056334 A1 | 3/2006 | Yuan | |
| 2006/0059425 A1 | 3/2006 | Anspach | |
| 2006/0150091 A1 | 7/2006 | Suzuki | |
| 2006/0174209 A1 | 8/2006 | Barros | |
| 2006/0230354 A1 | 10/2006 | Jennings | |
| 2006/0236251 A1 | 10/2006 | Kataoka | |
| 2006/0253777 A1 * | 11/2006 | Yalovsky | G06F 17/211 715/235 |
| 2007/0073719 A1 | 3/2007 | Ramer | |
| 2007/0088681 A1 | 4/2007 | Aravamudan | |
| 2007/0115300 A1 | 5/2007 | Barney | |
| 2007/0150826 A1 | 6/2007 | Anzures | |
| 2007/0198950 A1 | 8/2007 | Dodge | |
| 2007/0226640 A1 | 9/2007 | Holbrook | |
| 2007/0258642 A1 | 11/2007 | Thota | |
| 2007/0271516 A1 | 11/2007 | Carmichael | |
| 2007/0281733 A1 | 12/2007 | Griffin | |
| 2008/0022229 A1 | 1/2008 | Bhumkar | |
| 2008/0025529 A1 | 1/2008 | Keohane | |
| 2008/0052636 A1 | 2/2008 | Abe | |
| 2008/0052742 A1 | 2/2008 | Kopf | |
| 2008/0065675 A1 | 3/2008 | Bozich | |
| 2008/0079972 A1 | 4/2008 | Goodwin | |
| 2008/0082927 A1 | 4/2008 | Kelts | |
| 2008/0098330 A1 | 4/2008 | Tsuk | |
| 2008/0155458 A1 | 6/2008 | Fagans | |
| 2008/0168404 A1 | 7/2008 | Ording | |
| 2008/0174570 A1 | 7/2008 | Jobs | |
| 2008/0222540 A1 | 9/2008 | Schulz | |
| 2008/0276273 A1 | 11/2008 | Billmaier | |
| 2009/0007017 A1 | 1/2009 | Anzures | |
| 2009/0007188 A1 | 1/2009 | Omernick | |
| 2009/0061837 A1 | 3/2009 | Chaudhri | |
| 2009/0070710 A1 | 3/2009 | Kagaya | |

(56) References Cited

U.S. PATENT DOCUMENTS

| | | |
|---|---|---|
| 2009/0100373 A1 | 4/2009 | Pixley |
| 2009/0132921 A1 | 5/2009 | Hwangbo |
| 2009/0172532 A1 | 7/2009 | Chaudhri |
| 2009/0172543 A1 | 7/2009 | Cronin |
| 2009/0199091 A1 | 8/2009 | Covington |
| 2009/0201270 A1 | 8/2009 | Pikkujamsa |
| 2009/0204928 A1 | 8/2009 | Kallio |
| 2009/0228782 A1 | 9/2009 | Fraser |
| 2009/0228832 A1 | 9/2009 | Cheng |
| 2009/0249238 A1 | 10/2009 | Eilers |
| 2009/0249239 A1* | 10/2009 | Eilers .................. G06F 3/0486 715/769 |
| 2009/0271703 A1 | 10/2009 | Chu |
| 2009/0288032 A1 | 11/2009 | Chang |
| 2009/0300548 A1 | 12/2009 | Sullivan |
| 2009/0309846 A1 | 12/2009 | Trachtenberg |
| 2010/0060666 A1 | 3/2010 | Fong |
| 2010/0097338 A1 | 4/2010 | Miyashita |
| 2010/0114991 A1 | 5/2010 | Chaudhary |
| 2010/0119180 A1 | 5/2010 | Brichter |
| 2010/0122195 A1 | 5/2010 | Hwang |
| 2010/0122214 A1 | 5/2010 | Sengoku |
| 2010/0174993 A1 | 7/2010 | Pennington |
| 2010/0277496 A1 | 11/2010 | Kawanishi |
| 2010/0287494 A1 | 11/2010 | Ording |
| 2010/0313125 A1 | 12/2010 | Fleizach |
| 2011/0035703 A1 | 2/2011 | Negishi |
| 2011/0063248 A1 | 3/2011 | Yoon |
| 2011/0063325 A1* | 3/2011 | Saunders ................ G09G 5/00 345/639 |
| 2011/0074699 A1 | 3/2011 | Man |
| 2011/0122078 A1 | 5/2011 | Kasahara |
| 2011/0122159 A1 | 5/2011 | Bergsten |
| 2011/0157051 A1 | 6/2011 | Shohga |
| 2011/0161818 A1 | 6/2011 | Viljamaa |
| 2011/0163969 A1 | 7/2011 | Anzures |
| 2011/0163971 A1 | 7/2011 | Wagner |
| 2011/0167380 A1 | 7/2011 | Stallings |
| 2011/0185314 A1 | 7/2011 | Sahai |
| 2011/0187655 A1* | 8/2011 | Min ...................... G06F 1/1643 345/173 |
| 2011/0202834 A1 | 8/2011 | Mandryk |
| 2011/0209100 A1 | 8/2011 | Hinckley |
| 2011/0234615 A1* | 9/2011 | Hanson .................. G06F 9/451 345/589 |
| 2011/0246614 A1 | 10/2011 | Votaw |
| 2011/0276863 A1 | 11/2011 | Bhise |
| 2011/0296344 A1 | 12/2011 | Habib |
| 2011/0302532 A1 | 12/2011 | Missig |
| 2012/0005623 A1 | 1/2012 | Ishak |
| 2012/0026611 A1 | 2/2012 | Kinnucan |
| 2012/0047432 A1 | 2/2012 | Yalovsky |
| 2012/0054684 A1 | 3/2012 | Gossweiler |
| 2012/0070017 A1 | 3/2012 | Dorogusker |
| 2012/0084662 A1 | 4/2012 | Navarro |
| 2012/0105489 A1 | 5/2012 | Monroe |
| 2012/0131516 A1 | 5/2012 | Chiu |
| 2012/0148088 A1 | 6/2012 | Mital |
| 2012/0159381 A1 | 6/2012 | Tseng |
| 2012/0159393 A1 | 6/2012 | Sethi |
| 2012/0192101 A1 | 7/2012 | Migos |
| 2012/0192118 A1 | 7/2012 | Migos |
| 2012/0227002 A1 | 9/2012 | Tiwari et al. |
| 2012/0233565 A1 | 9/2012 | Grant |
| 2012/0233573 A1 | 9/2012 | Sullivan |
| 2012/0266068 A1 | 10/2012 | Ryman |
| 2012/0266104 A1 | 10/2012 | Shah |
| 2012/0266130 A1 | 10/2012 | Kinnucan |
| 2012/0272171 A1 | 10/2012 | Icho |
| 2012/0272181 A1 | 10/2012 | Rogers |
| 2012/0311438 A1 | 12/2012 | Cranfill |
| 2012/0327009 A1 | 12/2012 | Fleizach |
| 2013/0019263 A1 | 1/2013 | Ferren |
| 2013/0067510 A1 | 3/2013 | Ahanger |
| 2013/0073932 A1 | 3/2013 | Migos |
| 2013/0104017 A1 | 4/2013 | Ko |
| 2013/0135309 A1 | 5/2013 | King |
| 2013/0183943 A1 | 7/2013 | Tow |
| 2013/0194269 A1 | 8/2013 | Matas |
| 2013/0194307 A1 | 8/2013 | Matas |
| 2013/0198261 A1 | 8/2013 | Matas |
| 2013/0198631 A1 | 8/2013 | Matas |
| 2013/0198634 A1 | 8/2013 | Matas |
| 2013/0198661 A1 | 8/2013 | Matas |
| 2013/0198663 A1 | 8/2013 | Matas |
| 2013/0198664 A1 | 8/2013 | Matas |
| 2013/0198665 A1 | 8/2013 | Matas |
| 2013/0198666 A1 | 8/2013 | Matas |
| 2013/0198668 A1 | 8/2013 | Matas |
| 2013/0198681 A1 | 8/2013 | Matas |
| 2013/0198682 A1 | 8/2013 | Matas |
| 2013/0198683 A1 | 8/2013 | Matas |
| 2013/0205210 A1 | 8/2013 | Jeon |
| 2013/0227494 A1 | 8/2013 | Matas |
| 2013/0307792 A1 | 11/2013 | Andres |
| 2013/0314341 A1 | 11/2013 | Lee |
| 2013/0339907 A1 | 12/2013 | Matas |
| 2013/0346906 A1 | 12/2013 | Farago |
| 2014/0013283 A1 | 1/2014 | Matas |
| 2014/0033124 A1 | 1/2014 | Sorrick |
| 2014/0046809 A1 | 2/2014 | Baker |
| 2014/0164985 A1 | 6/2014 | Pimmel |
| 2014/0250358 A1 | 9/2014 | Milener |
| 2014/0258849 A1 | 9/2014 | Chung |
| 2014/0282262 A1 | 9/2014 | Gregotski |
| 2014/0282263 A1 | 9/2014 | Pennington |
| 2014/0288686 A1 | 9/2014 | Sant |
| 2015/0026825 A1 | 1/2015 | Dube |
| 2015/0095839 A1 | 4/2015 | Hombert |
| 2015/0100924 A1 | 4/2015 | Matas |

OTHER PUBLICATIONS

Response to Final Office Action for U.S. Appl. No. 13/487,765, dated Dec. 29, 2014.

Final Office Action for U.S. Appl. No. 13/487,765, dated Oct. 3, 2014.

Response to Non-Final Office Action for U.S. Appl. No. 13/487,765, dated Aug. 13, 2014.

Non-Final Office Action for U.S. Appl. No. 13/487,765, dated Mar. 14, 2014.

Response to Final Office Action for U.S. Appl. No. 13/487,805, dated Dec. 29, 2014.

Final Office Action for U.S. Appl. No. 13/487,805, dated Sep. 26, 2014.

Response to Non-Final Office Action for U.S. Appl. No. 13/487,805, dated Jul. 31, 2014.

Non-Final Office Action for U.S. Appl. No. 13/487,805, dated Apr. 3, 2014.

Final Office Action for U.S. Appl. No. 13/555,607, dated Dec. 3, 2014.

Response to Non-Final Office Action for U.S. Appl. No. 13/555,607, dated Nov. 4, 2014.

Non-Final Office Action for U.S. Appl. No. 13/555,607, dated Aug. 20, 2014.

Amendment under Rule 312 for U.S. Appl. No. 13/555,657, dated Dec. 30, 2014.

Notice of Allowance for U.S. Appl. No. 13/555,657, dated Dec. 5, 2014.

Response to Non-Final Office Action for U.S. Appl. No. 13/555,657, dated Nov. 19, 2014.

Non-Final Office Action for U.S. Appl. No. 13/555,657, dated Sep. 18, 2014.

Response to Non-Final Office Action for U.S. Appl. No. 13/555,845, dated Oct. 24, 2014.

Non-Final Office Action for U.S. Appl. No. 13/555,845, dated Apr. 24, 2014.

Final Office Action for U.S. Appl. No. 13/488,039, dated Dec. 12, 2014.

(56) References Cited

OTHER PUBLICATIONS

Response to Non-Final Office Action for U.S. Appl. No. 13/488,039, dated Nov. 7, 2014.
Non-Final Office Action for U.S. Appl. No. 13/488,039, dated Jun. 11, 2014.
Final Office Action for U.S. Appl. No. 13/555,876, dated Nov. 20, 2014.
Response to Non-Final Office Action for U.S. Appl. No. 13/555,876, dated Oct. 23, 2014.
Non-Final Office Action for U.S. Appl. No. 13/555,876, dated Jul. 14, 2014.
Response to Final Office Action for U.S. Appl. No. 13/490,343, dated Dec. 19, 2014.
Final Office Action for U.S. Appl. No. 13/490,343, dated Nov. 7, 2014.
Response to Non-Final Office Action for U.S. Appl. No. 13/490,343, dated Oct. 22, 2014.
Non-Final Office Action for U.S. Appl. No. 13/490,343, dated Jun. 4, 2014.
Response to Final Office Action for U.S. Appl. No. 13/488,076, dated Dec. 29, 2014.
Final Office Action for U.S. Appl. No. 13/488,076, dated Oct. 3, 2014.
Response to Non-Final Office Action for U.S. Appl. No. 13/488,076, dated Jul. 31, 2014.
Non-Final Office Action for U.S. Appl. No. 13/488,076, dated Apr. 1, 2014.
Non-Final Office Action for U.S. Appl. No. 13/555,909, dated Nov. 14, 2014.
Response to Final Office Action for U.S. Appl. No. 13/555,909, dated Aug. 8, 2014.
Final Office Action for U.S. Appl. No. 13/555,909, dated Apr. 28, 2014.
Response to Non-Final Office Action for U.S. Appl. No. 13/555,909, dated Mar. 27, 2014.
Non-Final Office Action for U.S. Appl. No. 13/555,909, dated Jan. 2, 2014.
Non-Final Office Action for U.S. Appl. No. 13/490,367, dated Nov. 20, 2014.
Response to Final Office Action for U.S. Appl. No. 13/490,367, dated Sep. 19, 2014.
Final Office Action for U.S. Appl. No. 13/490,367, dated May 1, 2014.
Response to Non-Final Office Action for U.S. Appl. No. 13/490,367, dated Apr. 4, 2014.
Non-Final Office Action for U.S. Appl. No. 13/490,367, dated Jan. 3, 2014.
Notice of Allowance for U.S. Appl. No. 13/490,736, dated Nov. 21, 2014.
Response to Non-Final Office Action for U.S. Appl. No. 13/490,736, dated Oct. 23, 2014.
Non-Final Office Action for U.S. Appl. No. 13/490,736, dated Jul. 8, 2014.
Final Office Action for U.S. Appl. No. 13/489,172, dated Dec. 12, 2014.
Response to Non-Final Office Action for U.S. Appl. No. 13/489,172, dated Aug. 12, 2014.
Non-Final Office Action for U.S. Appl. No. 13/489,172, dated Mar. 28, 2014.
Response to Non-Final Office Action for U.S. Appl. No. 13/491,100, dated Oct. 30, 2014.
Non-Final Office Action for U.S. Appl. No. 13/491,100, dated Jul. 31, 2014.
Notice of Allowance for U.S. Appl. No. 13/489,265, dated Nov. 7, 2014.
Response to Non-Final Office Action for U.S. Appl. No. 13/489,265, dated Oct. 28, 2014.
Non-Final Office Action for U.S. Appl. No. 13/489,265, dated May 2, 2014.
Response to Non-Final Office Action for U.S. Appl. No. 13/677,132, dated Jan. 5, 2015.
Non-Final Office Action for U.S. Appl. No. 13/677,132, dated Oct. 3, 2014.
Non-Final Office Action for U.S. Appl. No. 13/677,093, dated Nov. 21, 2014.
Final Office Action for U.S. Appl. No. 13/487,765, dated Jan. 14, 2015.
Final Office Action for U.S. Appl. No. 13/487,805, dated Jun. 1, 2015.
Response to Non-Final Office Action for U.S. Appl. No. 13/487,805, dated May 18, 2015.
Non-Final Office Action for U.S. Appl. No. 13/487,805, dated Jan. 16, 2015.
Notice of Allowance for U.S. Appl. No. 13/555,607, dated Mar. 4, 2015.
Response to Final Office Action for U.S. Appl. No. 13/555,607, dated Feb. 12, 2015.
Notice of Allowance for U.S. Appl. No. 13/555,657, dated Feb. 11, 2015.
Notice of Allowance for U.S. Appl. No. 13/555,845, dated Jan. 30, 2015.
Notice of Allowance for U.S. Appl. No. 13/555,845, dated Dec. 19, 2014.
Non-Final Office Action for U.S. Appl. No. 13/488,039, dated Apr. 24, 2015.
Response to Final Office Action for U.S. Appl. No. 13/488,039, dated Mar. 17, 2015.
Non-Final Office Action for U.S. Appl. No. 13/555,876, dated Apr. 30, 2015.
Response to Final Office Action for U.S. Appl. No. 13/555,876, dated Mar. 23, 2015.
Notice of Allowance for U.S. Appl. No. 13/490,343, dated Jan. 29, 2015.
Notice of Allowance for U.S. Appl. No. 13/490,343, dated Jan. 14, 2015.
Non-Final Office Action for U.S. Appl. No. 13/488,076, dated Jan. 15, 2015.
Response to Non-Final Office Action for U.S. Appl. No. 13/555,909, dated Mar. 4, 2015.
Final Office Action for U.S. Appl. No. 13/490,367, dated May 21, 2015.
Response to Non-Final Office Action for U.S. Appl. No. 13/490,367, dated Mar. 19, 2015.
Notice of Allowance for U.S. Appl. No. 13/490,736, dated Feb. 25, 2015.
Response to Final Office Action for U.S. Appl. No. 13/489,172, dated Feb. 12, 2015.
Non-Final Office Action for U.S. Appl. No. 13/491,100, dated May 29, 2015.
Response to Final Office Action for U.S. Appl. No. 13/491,100, dated May 18, 2015.
Final Office Action for U.S. Appl. No. 13/491,100, dated Feb. 27, 2015.
Notice of Allowance for U.S. Appl. No. 13/489,265, dated Jan. 30, 2015.
Final Office Action for U.S. Appl. No. 13/677,093, dated May 28, 2015.
Response to Non-Final Office Action for U.S. Appl. No. 13/677,093, dated Mar. 19, 2015.
Final Office Action for U.S. Appl. No. 13/677,132, dated Apr. 7, 2015.
Borst, C. et al., "A Spring Model for Whole-Hand Virtual Grasping," Presence, vol. 15, No. 1, pp. 47, 61, Feb. 2006, doi: 10.1162/pres.2006.15.1.47, http://ieeexplore.ieee.org/stamp/stamp.jsp?tp=&arnumber=6797721&isnumber= 6797198, Jun. 3, 2015.
Notice of Allowance for U.S. Appl. No. 13/487,765, dated Sep. 15, 2015.
Response to Final Office Action for U.S. Appl. No. 13/487,765, dated Jul. 14, 2015.
Response to Final Office Action for U.S. Appl. No. 13/487,805, dated Nov. 2, 2015.

(56) References Cited

OTHER PUBLICATIONS

Notice of Allowance for U.S. Appl. No. 13/488,039, dated Sep. 10, 2015.
Response to Non-Final Office Action for U.S. Appl. No. 13/488,039, dated Aug. 7, 2015.
Final Office Action for U.S. Appl. No. 13/555,876, dated Sep. 10, 2015.
Response to Final Office Action for U.S. Appl. No. 13/555,876, dated Aug. 5, 2015.
Notice of Allowance for U.S. Appl. No. 13/488,076, dated Aug. 31, 2015.
Response to Non-Final Office Action for U.S. Appl. No. 13/488,076, dated Jul. 15, 2015.
Notice of Allowance for U.S. Appl. No. 13/555,909, dated Jun. 24, 2015.
Notice of Allowance for U.S. Appl. No. 13/555,909, dated Jun. 3, 2015.
Response to Final Office Action for U.S. Appl. No. 13/490,367, dated Oct. 20, 2015.
Non-Final Office Action for U.S. Appl. No. 13/489,172, dated Oct. 7, 2015.
Notice of Allowance for U.S. Appl. No. 13/491,100, dated Sep. 18, 2015.
Response to Non-Final Office Action for U.S. Appl. No. 13/491,100, dated Aug. 28, 2015.
Non-Final Office Action for U.S. Appl. No. 13/677,093, dated Oct. 5, 2015.
Response to Final Office Action for U.S. Appl. No. 13/677,093, dated Aug. 13, 2015.
Final Office Action for U.S. Appl. No. 13/677,132, dated Sep. 28, 2015.
Response to Final Office Action for U.S. Appl. No. 13/677,132, dated Jun. 24, 2015.

\* cited by examiner

OVERLAY IMAGES AND TEXTS IN USER INTERFACE

RELATED APPLICATION(S)

This application is a continuation under 35 U.S.C. § 120 of U.S. patent application Ser. No. 13/489,265, filed Jun. 5, 2012, which claims the benefit, under 35 U.S.C. § 119(e), of U.S. Provisional Patent Application No. 61/593,841, filed Feb. 1, 2012, which is incorporated herein by reference.

TECHNICAL FIELD

This disclosure generally relates to overlaying texts on top of images for presentation to users.

BACKGROUND

A user interface (UI), in the industrial design field of human-machine interaction, is the space where interactions between humans and machines occur. The goal of interactions between a human, often referred to as a "user", and a machine at the user interface is user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

DESCRIPTION OF EXAMPLE EMBODIMENTS

In particular embodiments, a user interface (UI) may include any number of UI components or elements organized into a hierarchical structure. The positions of the individual UI components or elements within the hierarchy may indicate the relationships among the components or elements. The user interface may be presented to a user of an electronic device according to the hierarchical structure.

In particular embodiments, some of the interface components or elements may be images, videos, audios, or texts. Sometimes, text may be overlaid on top of an image. In such cases, the visual characteristics of the text or the image or both may be adjusted automatically, based on, for example and without limitation, the position of the text with respect to the image, the color or luminosity or size of the text, the color or luminosity of the portion of the image underneath or near the text, or the level of detail in the portion of the image underneath or near the text.

In particular embodiments, a UI editor may be provided to enable a person (e.g., a UI designer or developer) to design and create a user interface (e.g., defining the hierarchical structure of the user interface, selecting and laying out the individual UI components or elements, stipulating the operations associated with or behaviors of the individual UI components or elements, etc.). As a part of the UI design process using such a UI editor, a UI designer or developer may choose to overlay some text over an image. In particular embodiments, the UI editor may automatically adjust the visual appearance or characteristics of the text or the image or both so that when the image, with its overlaid text, are presented to a user (e.g., as a part of the user interface), it is easy for the user to read the text as well as seeing the image.

Figure 1:
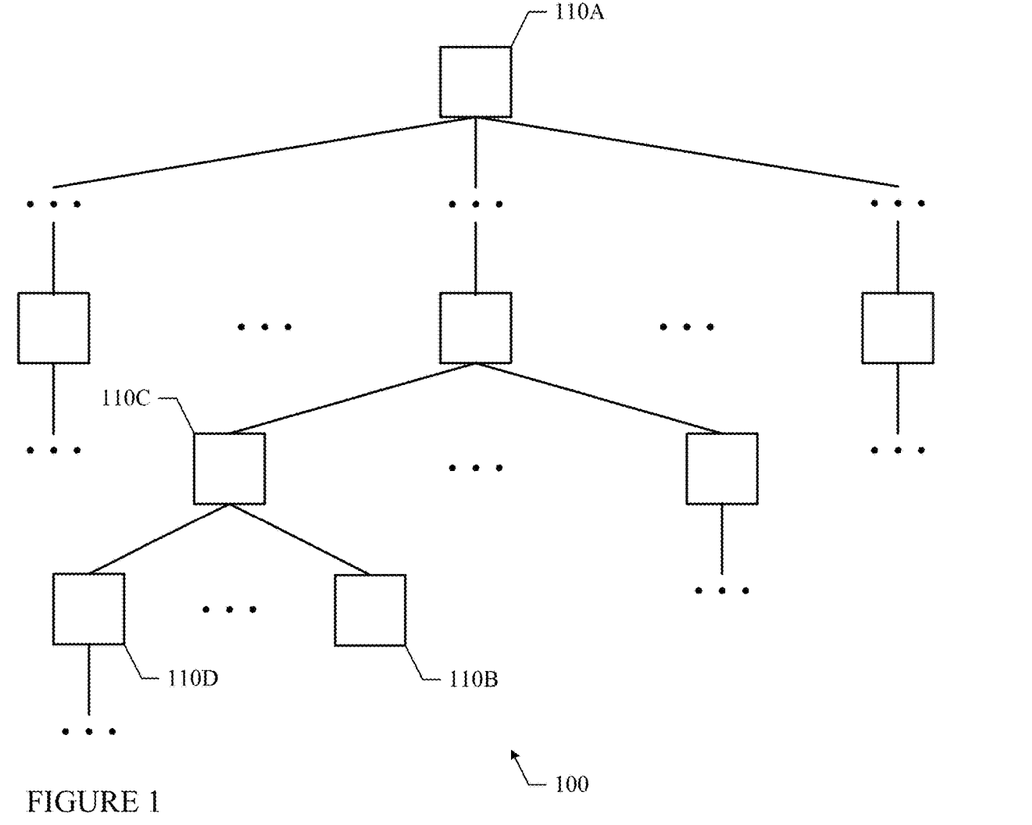
FIG. 1 illustrates an example hierarchical structure of a user interface.

In particular embodiments, a user interface may include any number of UI elements, some of which may be, for example and without limitation, text, image, video, or audio. These UI elements may be arranged according to a hierarchical structure. FIG. 1 illustrates an example hierarchy 100 representing a user interface having a number of UI elements. Each node 110 in FIG. 1 may represent or correspond to a specific UI element. In particular embodiments, a node (e.g., corresponding to a UI element) in a hierarchy may or may not have a parent. If a node does not have a parent, it may be referred to as a "root" node (e.g., node 110A). In particular embodiments, a node in a hierarchy may or may not have any children. If a node does not have any children, it may be referred to as a "leaf" node (e.g., node 110B). If a node does have children (e.g., node 110C), it may have any number of children. In addition, nodes sharing the same parent may be referred to as each other's "siblings". For example, in FIG. 1, node 110C is the parent of both nodes 110D and 110B. Nodes 110D and 110B are the children of node 110C and are siblings to each other. Thus, a hierarchy of nodes (e.g., node hierarchy 100) not only includes the individual nodes themselves but also indicates the relationships among the specific nodes. Moreover, the position of a specific node within the hierarchy may be used to indicate its relationships with other nodes in the hierarchy. Similarly, a hierarchy of UI elements not only includes the individual UI elements themselves but also indicates the relationships among the specific UI elements (e.g., within the user interface). Moreover, the position of a specific UI element within the hierarchy may be used to indicate its relationships with other UI elements in the user interface.

In particular embodiments, when a hierarchical user interface is displayed on an electronic device, the UI elements are displayed in layers. With some implementations, given two UI elements, if the first UI element is the parent of the second UI element, then the first UI element is displayed in a layer that is beneath the layer in which the second UI element is displayed. If the first UI element and the second UI element are siblings, then they are displayed in the same layer. In other words, the UI elements are displayed in layers corresponding to the levels of the hierarchy.

Figure 2:
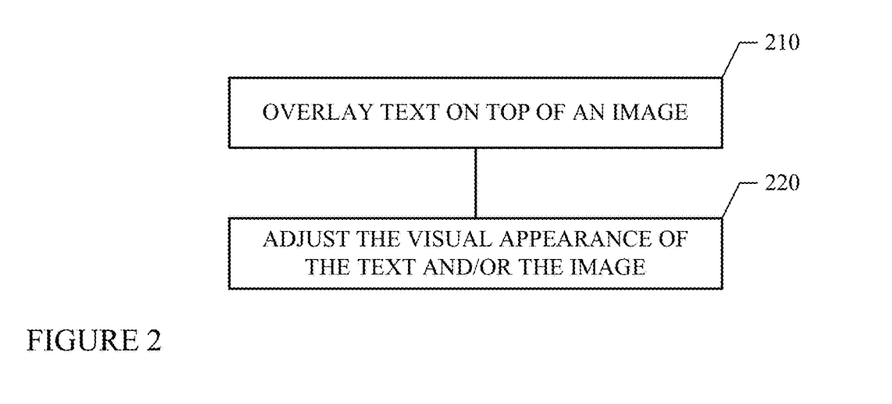
FIG. 2 illustrates an example method for overlaying text on top of an image.

In particular embodiments, there may be various types of UI elements, such as, for example and without limitation, windows, panels, web pages, buttons, menus, checkboxes, text input fields, icons, images, videos, audios, and links (e.g., uniform resource locators (URLs)), included in a user interface. In particular embodiments, in a user interface, text (e.g., a text UI element) may be overlaid on top of an image (e.g., an image UI element, the text as, for example, the image's caption, title, or description). FIG. 2 illustrates an example method for overlaying text on top of an image.

The method may start at step 210, where a text UI element is overlaid on top of an image UI element. For example, the text may be a caption or title of the image, or may provide a brief description or explanation of the image. At step 220, the visual appearance of the text, or the image, or both may be automatically adjusted, at which point the method may end.

In particular embodiments, an image and its overlaying text are two individual UI elements in the hierarchy of a user interface. For example, the image and its overlaying text may have a parent-child relationship in the hierarchy, with the image being the parent and the text being the child. When they are displayed on an electronic device, the image is displayed in one layer that is beneath another layer in which the text is displayed.

Figure 3A:
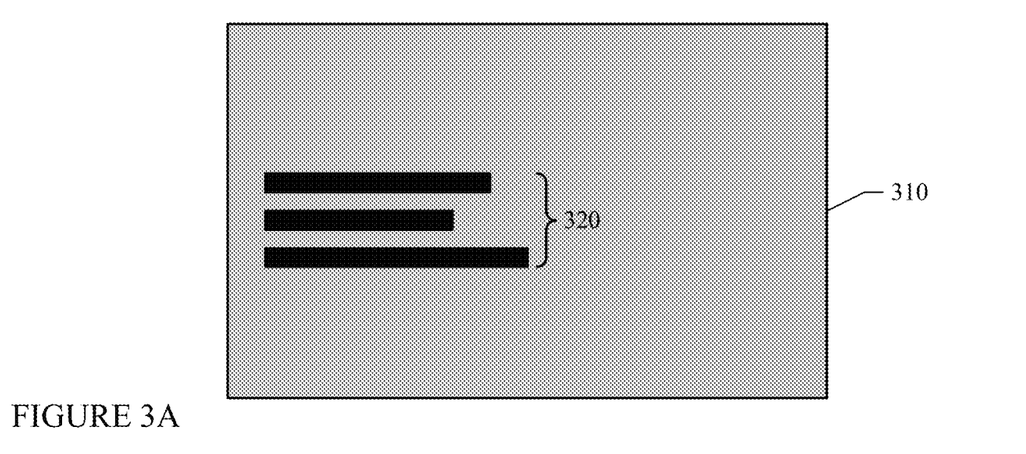
FIGS. 3A, 3B, and 3C illustrate an example for automatically aligning text overlaid on top of an image.
Figure 3B:
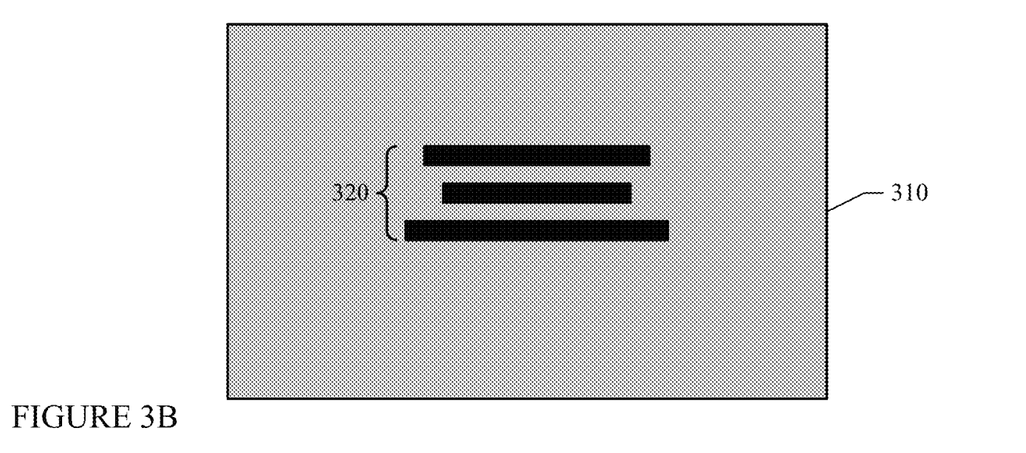
Figure 3C:
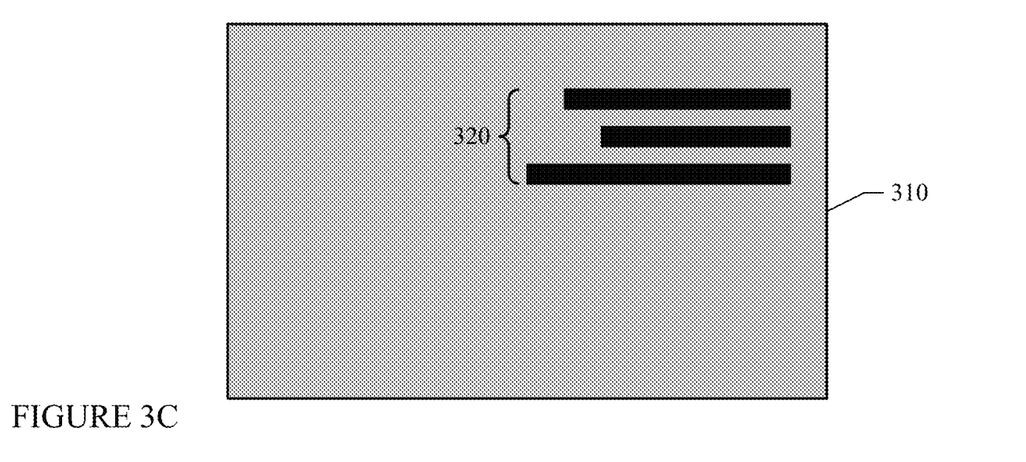

In particular embodiments, when text is overlaid on top of an image, depending on the relative positions of the text with respect to the image, the alignment of the text may be automatically adjusted. For example, as illustrated in FIG. 3A, when text 320 is positioned near the left of image 310, text 320 may be left aligned. As illustrated in FIG. 3B, when text 320 is positioned near the center of image 310, text 320 may be center aligned. As illustrated in FIG. 3C, when text 320 is positioned near the right of image 310, text 320 may be right aligned.

Figure 4A:
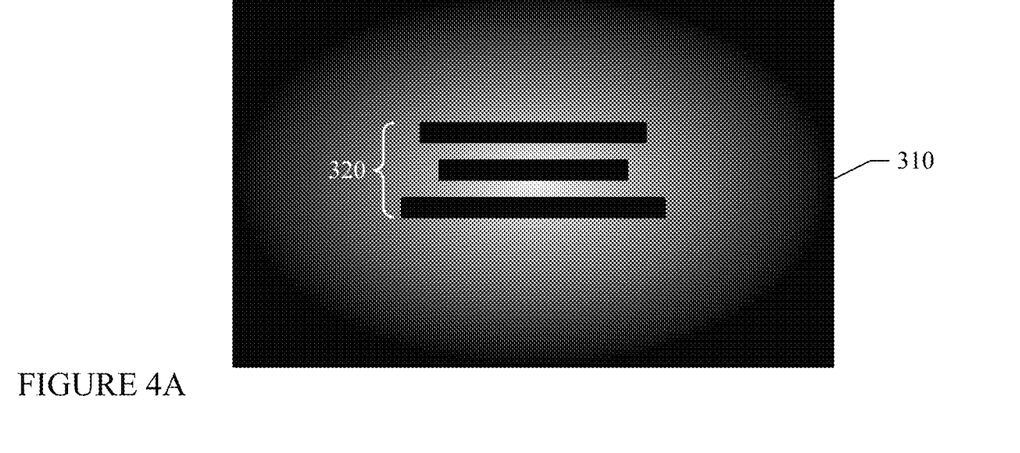
FIGS. 4A and 4B illustrate an example for automatically adjusting the color or luminosity of text overlaid on top of an image.
Figure 4B:
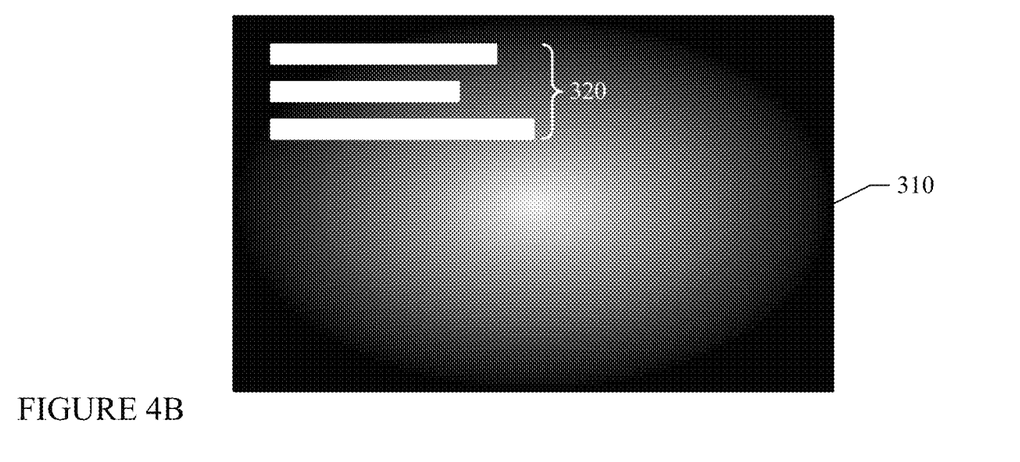

In particular embodiments, when text is overlaid on top of an image, depending on the color or luminosity of the portion of the image underneath the text, the color or luminosity of the text may be automatically adjusted. For example, as illustrated in FIG. 4A, when text 320 is positioned on top of a lighter portion of image 310, text 320 may be darker. Conversely, as illustrated in FIG. 4B, when text 320 is positioned on top of a darker portion of image 310, text 320 may be lighter. Similarly, the color of text 320 may be selected to be one that is somewhat in contrast to the color of the portion of image 310 underneath text 320 (e.g., red versus blue, yellow versus purple, etc.). By contrasting the overlaying text and the underlaying image, in terms of their color or luminosity, it is easier for a user to read the text overlaying an image.

Figure 5:
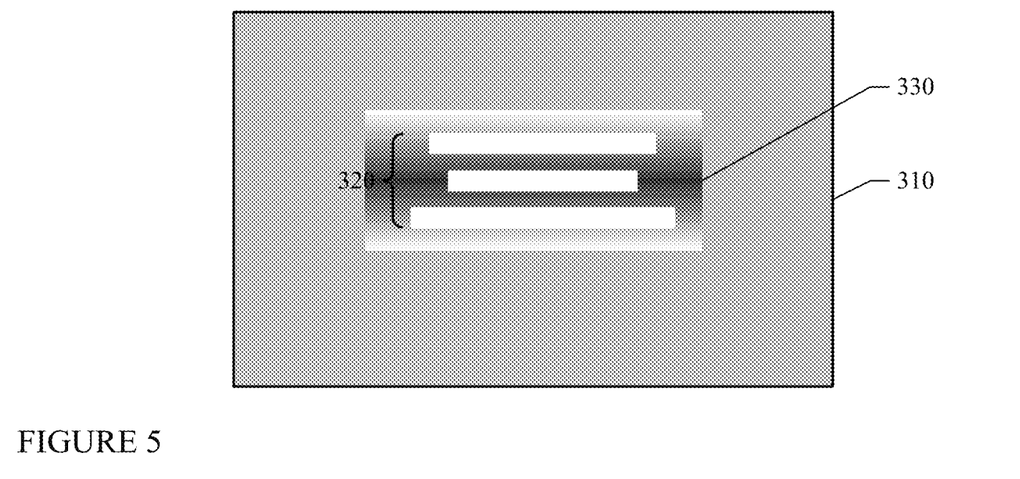
FIG. 5 illustrates an example for automatically adding shadow around text overlaid on top of an image.

In particular embodiments, when text is overlaid on top of an image, depending on the color or luminosity or level of detail of the portion of the image underneath the text, shadow may be automatically added or removed around the text. For example, as illustrated in FIG. 5, when text 320 is positioned on top of image 310, shadow 330 may be automatically added around text 320. Often, adding shadow around an UI element may serve several purposes. As an example, shadow 330 may add a three-dimensional (3D) visual effect that makes text 320 appears to be in front or on top of image 310. As another example, shadow 330 may provide a visual separation between text 320 and image 310, making it easier to read text 320, especially when text 320 and image 310 have similar colors or luminosity levels or when the portion of image 310 underneath text 320 has a lot of details (e.g., visually busy). In particular embodiments, shadow 330 may be transparent or semi-transparent so that the portion of image 310 underneath shadow 330 is still visible. Conversely, in other cases, shadow around text overlaid on top of an image may be automatically removed (e.g., when the shadow causes visual distraction to users).

In particular embodiments, in addition or alternative to adjusting the overlaying text, the underlaying image may be automatically adjusted. For example, when overlaying light color text on top of a light color image, the portion of the image beneath the text may be slightly darkened to make the text more visible. Conversely, when overlaying dark color text on top of a dark color image, the portion of the image beneath the text may be slightly lightened. Other characteristics of the underlaying image, such as, for example and without limitation, its luminosity or contrast, may be automatically adjusted when applicable to make the overlaying text stand out and thus easier to read.

Particular embodiments may repeat the steps of the method of FIG. 2, where appropriate. Moreover, although this disclosure describes and illustrates particular steps of the method of FIG. 2 as occurring in a particular order, this disclosure contemplates any suitable steps of the method of FIG. 2 occurring in any suitable order. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Although the method illustrated in FIG. 2 is described in connection with a layered user interface where the UI components are arranged in a hierarchy, the method may be similarly applied to place text on an image even when the text and the image are not separated into two layers. For example, the method may be applied to place text (e.g., caption) on a background image where the image is not necessarily user interactive. Moreover, the method may be similarly applied to overlay one UI component on top of another UI component in general. In this case, various characteristics of either the overlaying component or the underlaying component or both may be adjusted, wherever appropriate, so that it is easier to view both components.

Figure 6:
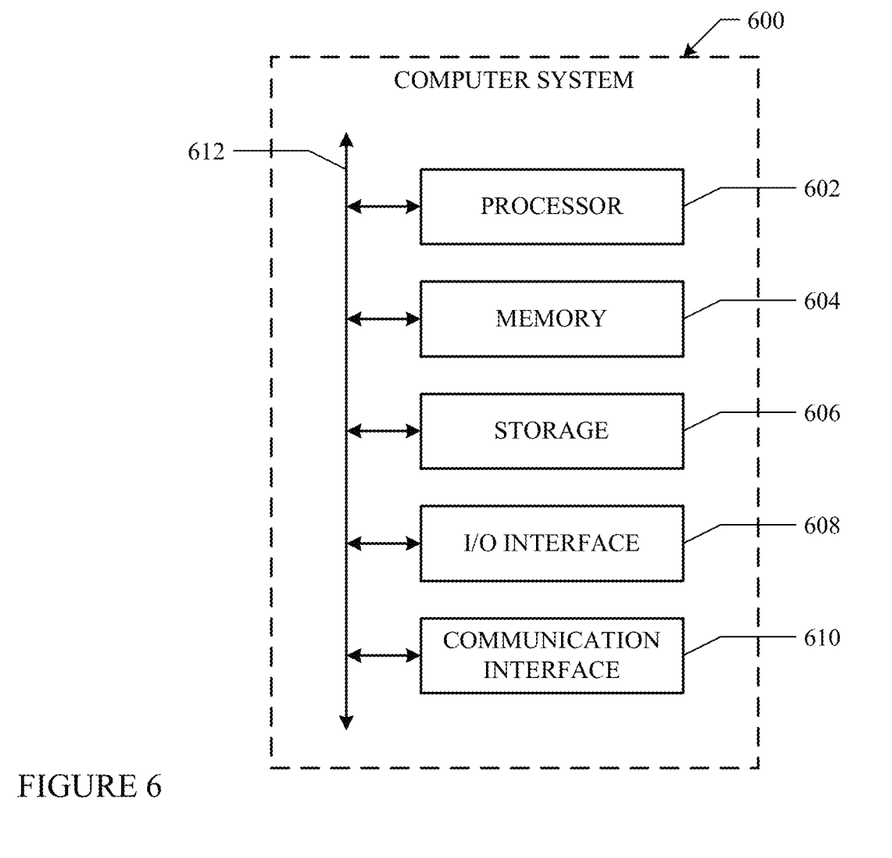
FIG. 6 illustrates an example computer system.

In particular embodiments, the method illustrated in FIG. 2 may be implemented as computer software executed on one or more computing or electronic devices. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, performed by one or more computing devices, comprising:
    receiving, via the one or more computing devices, a user input from a user comprising a text element and an image element, wherein the text element and the image element are non-overlaid upon receipt, and wherein the text element includes at least one of a word or a plurality of text characters;
    overlaying, via the one or more computing devices, the text element directly on top of the image element in a user interface such that at least a portion of the image element is covered by the at least one of a word or a plurality of text characters of the text element;
    determining, via the one or more computing devices, whether the text element comprises light-colored text or dark-colored text;
    in response to determining that the text element comprises light-colored text or dark-colored text, automatically adjusting, via the one or more computing devices, a visual appearance of the covered portion of the image element underneath the text element by darkening the covered portion of the image element when the text element comprises light-colored text, and lightening the covered portion of the image element when the text element comprises dark-colored text;
    determining, via the one or more computing devices, a text alignment for the text element based on a horizontal position of the text element relative to the overlaid image element, wherein the text alignment is one of a left alignment, a center alignment, or a right alignment;
    automatically aligning, via the one or more computing devices, every line of text of the text element according to the determined text alignment;
    adding, via the one or more computing devices, a shadow around the text element to display a three-dimensional visual effect to provide a visual separation between the text element and the overlaid image element; and
    displaying, via the one or more computing devices, the adjusted image element, the aligned text element and the shadow on the user interface.

2. The method of claim 1, further comprising:
    displaying the text element on a first layer of the user interface; and
    displaying the image element on a second layer of the user interface,
    wherein the first layer and second layer are arranged in a hierarchy and displayed on the user interface according a structure of the hierarchy.

3. The method of claim 2, wherein the overlaying the text element directly on top of the image element in the user interface comprises visually overlaying the first layer displaying the text element on top of the second layer displaying the image element in a same region of the user interface.

4. The method of claim 1, wherein the adjusting the visual appearance of the portion of the image element further comprises selecting a first luminosity level for the portion of the image element that is in contrast to a second luminosity level of the text element overlaying the image element.

5. The method of claim 1, wherein the adjusting the visual appearance of the portion of the image element further comprises selecting a first color for the portion of the image element that is in contrast to a second color of the text element overlaying the image element.

6. The method of claim 1, further comprising:
   adjusting a visual appearance of the text element based on the portion of the image element underneath the text element,
   wherein the adjusting the visual appearance of the text element comprises adding or removing the shadow around the text element based on the visual appearance of the portion of the image element underneath the text element.

7. The method of claim 6, further comprising adjusting the transparency of the shadow around the text element to increase visibility of the portion of the image element underneath the text element.

8. One or more computer-readable non-transitory storage media embodying logic that is operable when executed to:
   receive, via the one or more computing devices, a user input from a user comprising a text element and an image element, wherein the text element and the image element are non-overlaid upon receipt, and wherein the text element includes at least one of a word or a plurality of text characters;
   overlay, via the one or more computing devices, the text element directly on top of the image element in a user interface such that at least a portion of the image element is covered by the at least one of a word or a plurality of text characters of the text element;
   determine, via the one or more computing devices, whether the text element comprises light-colored text or dark-colored text;
   in response to determining that the text element comprises light-colored text or dark-colored text, automatically adjust, via the one or more computing devices, a visual appearance of the covered portion of the image element underneath the text element by darkening the covered portion of the image element when the text element comprises light-colored text, and lightening the covered portion of the image element when the text element comprises dark-colored text;
   determine, via the one or more computing devices, a text alignment for the text element based on a horizontal position of the text element relative to the overlaid image element, wherein the text alignment is one of a left alignment, a center alignment, or a right alignment;
   automatically align, via the one or more computing devices, every line of text of the text element according to the determined text alignment;
   add, via the one or more computing devices, a shadow around the text element to display a three-dimensional visual effect to provide a visual separation between the text element and the overlaid image element; and
   display, via the one or more computing devices, the adjusted image element, the aligned text element and the shadow on the user interface.

9. The media of claim 8 further embodying logic operable to:
   display the text element on a first layer of the user interface; and
   display the image element on a second layer of the user interface,
   wherein the first layer and second layer are arranged in a hierarchy and displayed on the user interface according a structure of the hierarchy.

10. The media of claim 9, wherein the overlaying the text element directly on top of the image element in the user interface comprises visually overlaying the first layer displaying the text element on top of the second layer displaying the image element in a same region of the user interface.

11. The media of claim 8, wherein the adjusting the visual appearance of the portion of the image element further comprises selecting a first luminosity level for the portion of the image element that is in contrast to a second luminosity level of the text element overlaying the image element.

12. The media of claim 8, wherein the adjusting the visual appearance of the portion of the image element further comprises selecting a first color for the portion of the image element that is in contrast to a second color of the text element overlaying the image element.

13. The media of claim 8 further embodying logic operable to:
   adjust a visual appearance of the text element based on the portion of the image element underneath the text element,
   wherein the adjusting the visual appearance of the text element comprises adding or removing the shadow around the text element based on the visual appearance of the portion of the image element underneath the text element.

14. The media of claim 13 further embodying logic operable to adjust the transparency of the shadow around the text element to increase visibility of the portion of the image element underneath the text element.

15. A system comprising:
   a memory comprising instructions executable by one or more processors; and
   the one or more processors coupled to the memory and operable to execute the instructions, the one or more processors being operable when executing the instructions to:
   receive, via the one or more computing devices, a user input from a user comprising a text element and an image element, wherein the text element and the image element are non-overlaid upon receipt, and wherein the text element includes at least one of a word or a plurality of text characters;
   overlay, via the one or more computing devices, the text element directly on top of the image element in a user interface such that at least a portion of the image element is covered by the at least one of a word or a plurality of text characters of the text element;
   determine, via the one or more computing devices, whether the text element comprises light-colored text or dark-colored text;
   in response to determining that the text element comprises light-colored text or dark-colored text, automatically adjust, via the one or more computing devices, a visual appearance of the covered portion of the image element underneath the text element by darkening the covered portion of the image element when the text element comprises light-colored text, and lightening the covered portion of the image element when the text element comprises dark-colored text;

determine, via the one or more computing devices, a text alignment for the text element based on a horizontal position of the text element relative to the overlaid image element, wherein the text alignment is one of a left alignment, a center alignment, or a right alignment;

automatically align, via the one or more computing devices, every line of text of the text element according to the determined text alignment;

add, via the one or more computing devices, a shadow around the text element to display a three-dimensional visual effect to provide a visual separation between the text element and the overlaid image element; and display, via the one or more computing devices, the adjusted image element, the aligned text element and the shadow on the user interface.

16. The system of claim 15 further comprising one or more processors operable to:

display the text element on a first layer of the user interface; and display the image element on a second layer of the user interface, wherein the first layer and second layer are arranged in a hierarchy and displayed on the user interface according a structure of the hierarchy.

17. The system of claim 16, wherein the overlaying the text element directly on top of the image element in the user interface comprises visually overlaying the first layer displaying the text element on top of the second layer displaying the image element in a same region of the user interface.

18. The system of claim 15, wherein the adjusting the visual appearance of the portion of the image element further comprises selecting a first luminosity level for the portion of the image element that is in contrast to a second luminosity level of the text element overlaying the image element.

19. The system of claim 15, wherein the adjusting the visual appearance of the image element further comprises selecting a first color for the image element that is in contrast to a second color of the text element overlaying the image element.

* * * * *